No. 697,903. Patented Apr. 15, 1902.
W. M. VISER.
FLOUR SIFTER.
(Application filed July 26, 1901.)
(No Model.)
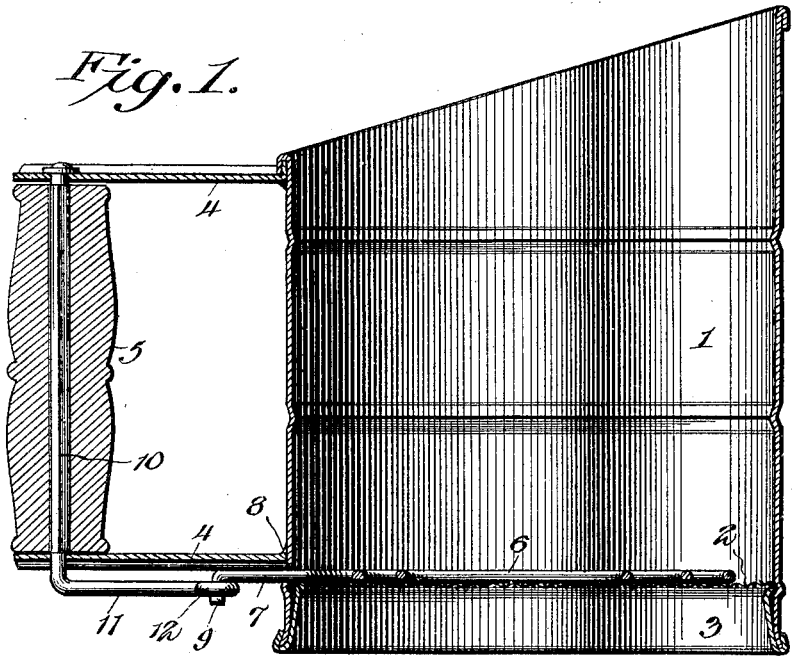
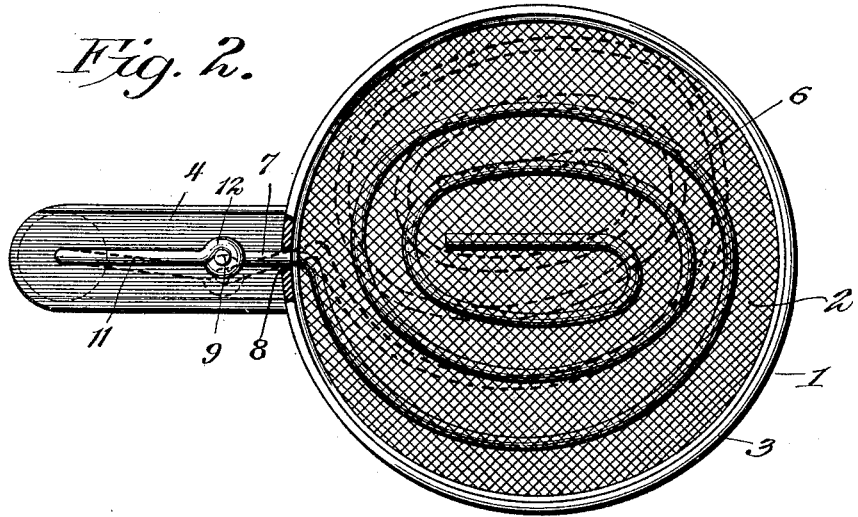
William M. Viser, Inventor:
Witnesses
Howard D. Orr.
H. F. Shepard.
By E. G. Siggers.
Attorney

UNITED STATES PATENT OFFICE.

WILLIAM MORTIMER VISER, OF HARRODSBURG, KENTUCKY.

FLOUR-SIFTER.

SPECIFICATION forming part of Letters Patent No. 697,903, dated April 15, 1902.

Application filed July 26, 1901. Serial No. 69,827. (No model.)

*To all whom it may concern:*

Be it known that I, WILLIAM MORTIMER VISER, a citizen of the United States, residing at Harrodsburg, in the county of Mercer and State of Kentucky, have invented a new and useful Flour-Sifter, of which the following is a specification.

This invention relates to sifters, and has for its object to provide an improved household sifter for sifting flour, meal, and the like. It is also designed to arrange for facilitating the manipulation of the device and to require but a slight movement of a single hand to operate the agitator with a quick positive swing.

A further object resides in mounting the agitator so as to prevent loss or leakage of the contents of the sifter and to obviate the tendency to scatter the material during the sifting operation, and finally to have the movable parts of the device arranged so as to be protected by the handle and not to interfere with the introduction of flour or the like into the sifter.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a central longitudinal sectional view of a sifter embodying the present invention. Fig. 2 is a bottom plan view thereof, parts being broken away to show the fulcrum-support of the agitator.

Like characters of reference designate corresponding parts in all the figures of the drawings.

Referring to the drawings, 1 designates an open-ended tubular body having its upper end portion formed into a scoop and its lower end provided with a foraminous bottom or sieve 2, that is located somewhat above the lower edge of the body, thereby to provide a lower marginal supporting-flange 3. Upon the exterior of the body there is provided a pair of opposite handle-brackets 4, between the outer ends of which a handle 5 is rotatably mounted. Within the body and working over the upper side of the sieve is a skeleton agitator 6, which is designed to be actuated from the rotatable handle. These parts of the device are common and well known and form no part of the present invention, and therefore may have any preferred shape or form.

In carrying out the present invention it is designed to provide an improved operative connection between the agitator and the handle, so as to secure a quick and positive reciprocatory action of the agitator. It is preferred to form the agitator from a single length of stiff wire, which is bent into a flat coil, one end of which is formed into a straight shank or stem 7, that is projected outwardly through a perforation 8 in the rear of the body and immediately below the lower handle-bracket, the outer end of the stem being terminated between the body and the handle and formed into a terminal hook 9. The stem has a comparatively close fit within the perforation in the body, and the walls of the latter are designed to form an intermediate fulcrum connection between the stem and the body, and the stem is designed to close the perforation, so as to prevent the loss or leakage of flour or whatever material is being sifted. The rotatable handle is preferably mounted upon a central spindle 10, which has its upper end journaled in the upper handle-bracket and its lower end portion journaled in the lower handle-bracket, said lower end portion being extended and formed into a crank-arm 11, which is extended inwardly and provided with a terminal eye 12, with which is loosely engaged the terminal hook of the agitator-stem, whereby a loose or pivotal connection is formed between said stem and the rotatable handle.

From the foregoing description it will be apparent that the agitator may be conveniently operated by grasping the handle and moving the same to impart a slight swinging movement of the body upon the pivotal connection between the latter and the handle, whereby the agitator is operated through the fulcrum mounting of the stem and the pivotal connection between the latter and the handle. In view of the fact that the stem is intermediately fulcrumed a quick and positive throw is imparted to the agitator by a very slight movement of the hand of the operator. Moreover, all of the operating parts are located at the bottom of the body and therefore do not interfere with the introduction of flour into the body, and the stem and crank are mounted below and adjacent to the lower handle-bracket, whereby said parts are effectively covered and protected. Heretofore similar devices have employed a slot formed in the side of the body for the reception of the operative connection between the agitator and the handle, whereby the slot permits of loss or leakage of the flour, which disadvantage has been overcome by the present invention in mounting the stem in a comparatively small opening, so that said stem forms a closure for the opening and to prevent loss or leakage of the contents of the body. Moreover, a slot permits of a comparatively wide range of movement of the agitator, whereby there is a tendency to scatter the material being sifted. This scattering tendency is effectually overcome in the present invention by reason of the short quick throw of the agitator and the correspondingly slight movement of the operator's hand and the body of the sifter, it being understood that the device is designed to be operated by one hand only, so that the other hand may be free for performing any other work. As clearly shown in both of the figures, the stem portion 7 forms a closure for the opening in the body of the sifter, and thereby effectually prevents loss of the flour or other material.

What I claim is—

1. A sifter consisting of an open-ended body, a sieve therein, an external rotatable handle, an agitator coöperating with the sieve and having a stem projected outwardly through the body and fulcrumed therein, and an operative connection between the rotatable handle and the outer end of the stem.

2. A sifter comprising a body, a sieve therein, a rotatable handle, an agitator coöperating with the sieve and provided with a stem projected outwardly through the body and fulcrumed therein, and a crank-arm carried by the rotatable handle and loosely connected to the outer end of the stem.

3. A sifter comprising a body, a sieve therein, opposite handle-brackets projected outwardly from the body, a rotatable handle mounted between the brackets, an agitator coöperating with the sieve and provided with a stem projected outwardly through an opening in the body and located below the lower handle-bracket, the stem forming a closure for the opening and also having an intermediate fulcrum connection with the edges of said opening, and a crank-arm carried by the lower end of the rotatable handle and having a pivotal connection with the outer end of the stem, said pivotal connection being located between the handle and the body of the sifter.

In testimony that I claim the foregoing as my own I have hereto affixed my signature in the presence of two witnesses.

WILLIAM MORTIMER VISER.

Witnesses:
W. T. WASHINGTON,
W. L. VOORHIES.